US00RE35563E

United States Patent [19]

Sisson

[11] E Patent Number: Re. 35,563

[45] Reissued Date of Patent: Jul. 22, 1997

[54] GARMENT CONTAINER APPARATUS

[75] Inventor: Girard B. Sisson, Gilbertsville, Ky.

[73] Assignee: Samsonite Corporation, Denver, Colo.

[21] Appl. No.: 252,807

[22] Filed: Jun. 2, 1994

Related U.S. Patent Documents

Reissue of:

[64] Patent No.: 5,117,951
Issued: Jun. 2, 1992
Appl. No.: 787,361
Filed: Nov. 4, 1991

[51] Int. Cl.[6] ..... A45C 5/12

[52] U.S. Cl. ..... 190/13 C; 190/13 R; 206/293; 206/298

[58] Field of Search ..... 190/13 R, 13 C, 190/36; 206/292, 293, 298

[56] References Cited

U.S. PATENT DOCUMENTS

| | | | |
|---|---|---|---|
| Re. 14,346 | 8/1917 | Graves | 190/13 C |
| 1,382,964 | 6/1921 | Fasel et al. | 206/298 |
| 1,799,521 | 4/1931 | Levine et al. | 190/13 C |
| 1,813,955 | 7/1931 | Ritter, Jr. | 206/292 |
| 1,989,778 | 2/1935 | Wintz | 206/298 |
| 2,016,688 | 10/1935 | Stelljes | 206/298 |
| 2,247,965 | 7/1941 | Ritter, Jr. | 206/298 |
| 2,281,114 | 4/1942 | Schwab | 206/298 |
| 2,417,387 | 3/1947 | Totty | 190/13 C |
| 3,587,794 | 6/1971 | Mattel | 190/13 R |
| 4,863,018 | 9/1989 | King et al. | 190/13 C |

*Primary Examiner*—Gary E. Elkins
*Attorney, Agent, or Firm*—Rod D. Baker; Gregory W. O'Connor

[57] ABSTRACT

A garment container apparatus includes a rigid outer structure having hingably connected first and second storage sections with rigid side walls defining opposite sides of the container when closed. The first storage section has at its base, adjacent the hinged connection with the second storage section, a plurality of moveable storage enclosures. The enclosures are hingably connected to the base for swinging movement between a stored position and an open position. The first storage section also includes a garment support structure having two support members attached at a 90° angle to each other. One support member is pivotally connected to opposed margin walls of the first storage section for opening and closing movement. A mounting structure including an inflatable bladder and a cooperating restraint bar is integral to the pivot mounted support member and defines a compression zone therebetween. The remaining support member is in a vertical attitude when the garment support structure is opened and is adapted to retain a clothing hanger. A garment placed on the hanger is secured between the restraint bar and the inflatable bladder, and air pressure is applied to the bladder so that the garment is held and prevented from wrinkling. When it is desired to close the container, the garment support structure is unlatched and rotated downward and locked into secured position by replacement of the moveable enclosures to a stored position. In this rotation, the bladder, bar and garment remain in a fixed position relative to each other.

20 Claims, 2 Drawing Sheets

GARMENT CONTAINER APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a garment container apparatus, and in particular to an apparatus having a first storage section adapted for transporting hanging garments, and a second storage section hingedly connected therewith and designed for transportation of related items such as, for example, toiletries and clothing accessories. The first storage section includes a garment support structure pivotally mounted between opposed marginal walls. The garment support structure is adapted to pivot between a first closed position and a second open position, and has an inflatable bladder which cooperates with a rigid cushion restraint means to hold hanging garments in fixed position to prevent wrinkling.

2. Discussion of the Prior Art

Various types of luggage structures and systems have been devised over many years. Certain types of luggage containers are well adapted for casual travel purposes, including duffel type bags and modern soft-sided luggage. This category of luggage is particularly well suited to vacation and similar casual travel, since the purpose of such travel permits and indeed encourages the packing of clothing which is not intended for use in formal settings.

Business travel, however, generally calls for the transportation of a different category of personal items. Certain items, for example, shoes, toiletries, undergarments and clothing accessories, are generally transported for both casual and business purposes. However, business travel nearly always requires in addition the transportation of business clothing, including business suits. For this latter category of clothing items, soft luggage or duffel bags are not suitable, simply because these types of luggage do not provide for packing of business clothing in such manner that the clothing remains neat and unwrinkled.

In modern times, there has been a progression of developments in the area of luggage designed for business travel. During the period when domestic travel was primarily by train, and international travel exclusively by ship, large travel trunks were utilized for business as well as other travel. Such trunks included space for hanging business clothing, as well as removable compartments or drawers for the storage of shirts, shoes and other clothing items. These trunks, however, while well adapted for transporting a variety of clothing, are heavy and bulky and thus not particularly well suited for use in modern travel by airplane and car.

With the advent of these more modern means of conveyance, lighter and more streamlined luggage came into favor. These hard-sided suitcases featured a more narrow profile, and were intended to perform something of the function of a trunk, being designed to hold both business clothing and other items. Therefore, these suitcases generally included one side devoted to carrying supporting items such as shoes, toiletries and the like, and another side specially adapted for carrying business clothing. In particular, these cases featured some sort of mechanism to securely hold clothing hooks, and a restraint means, typically a ladder-like structure, that was intended to prevent wrinkling.

Because of the shortcomings of hard-sided luggage, particularly with regard to their general failure to maintain the shape and neatness of business clothing, the luggage industry developed the modern soft garment bag. This type of luggage is designed to pack garments by hanging them of hangers, full length, in the unfolded bag suspended from one end above the floor. The garments are secured and the bag is loaded ready for carrying by unhooking, laying flat, folding doubly the bag with contents and strapping shut. Some garment bags incorporate pockets sewn into the extremities to accommodate the packing of other clothing items and accessories, but because of the limitation of cubic space in such a design it is usually easier to utilize a smaller second piece of luggage for carrying non-garment items.

This latter tendency, to associate a garment bag with a smaller bag for carrying related materials, has led to the development of yet another type of luggage, namely a combination garment bag/valise. This development generally involves the detachable connection of the two luggage bags, usually by wrapping the garment bag around the valise.

As the foregoing suggests, the problem of how to transport hanging business clothing in one container with other materials in such manner that the business clothing remains neat and unwrinkled has yet to be resolved.

SUMMARY OF THE INVENTION

It is an object of the present invention to provide a garment container apparatus including a rigid outer structure having hingedly connected first and second storage sections.

Another object of the invention is to provide a garment container apparatus wherein the storage sections have rigid side walls, defining opposite sides of the container when the container is in the closed position.

A further object of the invention is to provide a garment container apparatus in which each of the rigid side walls has a plurality of marginal walls defining the first and second storage sections.

Yet another object of the invention is to provide a garment container apparatus wherein the first storage section includes a garment support structure having a first support member and a second support member.

It is another object of the invention to provide a garment container apparatus wherein the first support member is pivotally connected to opposed marginal walls for pivotal movement between a first open position and a second closed position.

Another object of the invention is to provide a garment container apparatus in which the second support member has a first end and a second end, the first end being permanently engaged with the first support member such that each support member is in 90° relation to the other, the second end being adapted to removably receive a clothing hanger.

A further object of the invention is to provide a garment container apparatus wherein the first support member includes a mounting structure extending between opposed marginal walls.

It is another object of the invention to provide a garment container apparatus in which the mounting structure has at opposed ends thereof connecting means adapted to receive a cushioned rigid restraint means.

A further object of the invention is to provide a garment container apparatus wherein the mounting structure further includes an integral inflatable bladder defining a compression zone between the bladder and the rigid restraint means.

Yet another object of the invention is to provide a garment container apparatus wherein pivotal rotation of the first support member from a first open position to a second closed position entails arcuate movement of the bladder and the restraint means about the first support member pivot point in such manner that the bladder and the restraint means remain in fixed relationship to each other.

In accordance with the invention, a garment container apparatus may be manufactured of any appropriate rigid material. The apparatus has a rigid outer structure, in which side walls and a plurality of opposed marginal walls define hingedly connected first and second storage sections. The storage sections are selectively hingeable with respect to each other by at least 90° between open and close positions. The first storage section includes two moveable storage enclosures at its base which are pivotally connected to the base for swinging movement between a stored position and an open position. The first storage section also has a garment support structure. The garment support structure has a first support member pivotally connected to opposed marginal walls and a second support member permanently attached to the first support member and forming a 90° angle therewith. The garment support structure pivots between a first open position, wherein the second support member is deployed for use with a garment hanger, and a second closed position in which the structure is enclose within the first storage section. The second support member is adapted to receive a clothing hanger, while the first support member includes an integral inflatable bladder and adjustable connections for attaching a padded restraint bar. When a garment such as a suit jacket is hung from the hanger, its lower portion is placed so that the air bladder is at the back of the garment, and the padded restraint bar is positioned against the garment front. When the garment has been adjusted to eliminate wrinkles, the bladder is inflated to hold the garment in the desired position. When the garment support structure, including the hanging garment, is pivoted to the closed position, the bladder, garment and restraint bar remain fixed relative to each other, thereby discouraging wrinkling by preserving the prearranged tension of the garment fabric between hanger and bladder. The cooperation between the air bladder/restraint bar and the hanger maintain the neatness and natural shape of the garments during shipping.

BRIEF DESCRIPTION OF THE DRAWINGS

A preferred embodiment of the invention is described in detail below with reference to the attached drawing figures, wherein.

DETAILED DESCRIPTION OF THE PREFERRED EMBODIMENT

Figure 1:
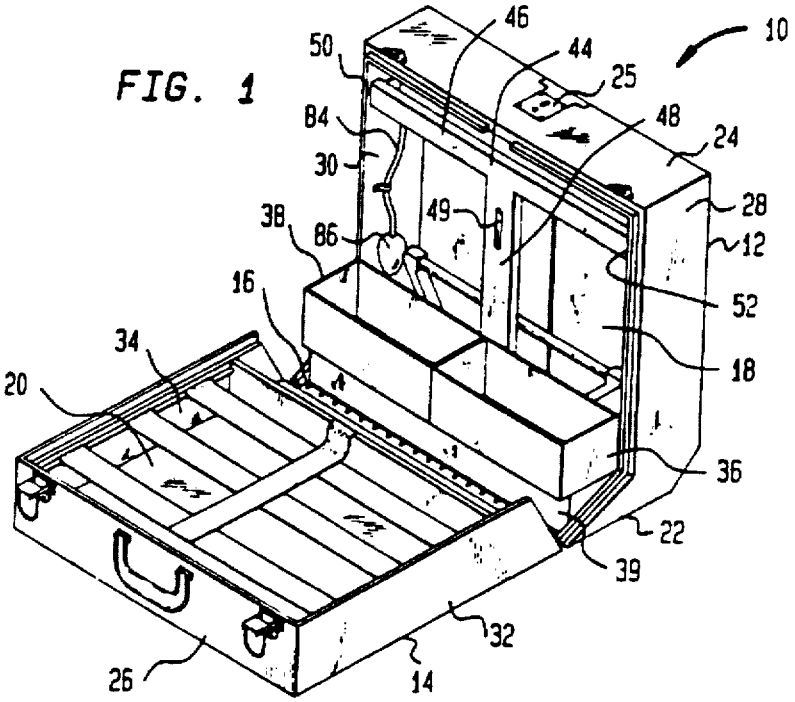
FIG. 1 is a perspective view of a garment container apparatus, constructed in accordance with the preferred embodiment.

A garment container apparatus 10 constructed in accordance with a preferred embodiment of the present invention is illustrated in FIG. 1. It includes a first storage section 12 and a second storage section 14 connected by hinge 16. First storage section side wall 18 and second storage section side wall 20 define opposite sides of the container 10 when it is in the closed position.

First storage section 12 includes a base 22 which defines a 90° angle from side wall 18. Hinge 16 extends along the exposed open edge of the base 22. Opposed to base 22 is first storage section end wall 24, which includes a latch strike 25 the purpose of which will be discussed below. Second storage section 14 has an end wall 26 which corresponds to and contacts end wall 24 when the container is in the closed position. Contacting end wall 24 and base 22 are first storage section margin walls 28 and 30. Contacting end wall 26 are the second storage section margin walls 32 and 34 which correspond to and contact margin walls 28 and 30 of the first storage section when the garment container is in a closed position.

In the illustrated example, first storage section 12 has a pair of moveable storage enclosures 36 and 38. When the container 10 is positioned for closing, enclosures 36 and 38 are seated on base interior platform 39, which defines the interior surface of base 22. For reasons which are discussed below, enclosures 36 and 38 are connected to base 22 by hinges 40 and 42 respectively.

Figure 2:
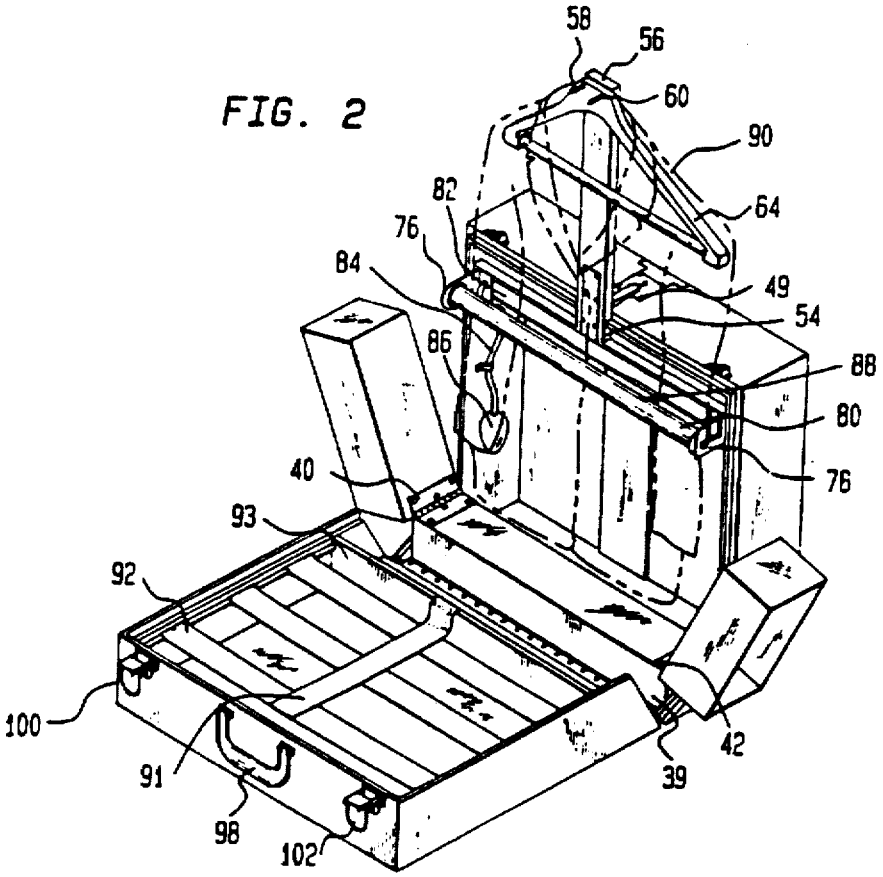
FIG. 2 is a perspective view of the garment container apparatus of FIG. 1, illustrating the garment support structure in the open or extended position, with a garment shown in phantom lines.
Figure 3:
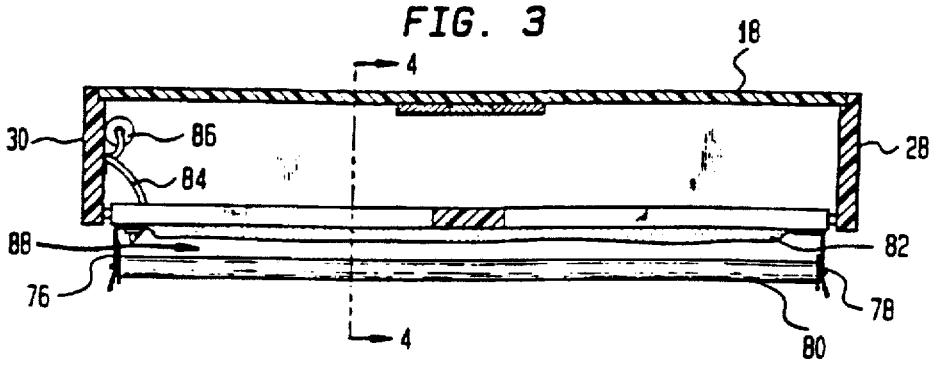
FIG. 3 is a top plan view of the first storage section of the garment container apparatus of FIG. 1, with an end wall broken away and the garment support structure in the open position, taken along lines 4—4.
Figure 4:
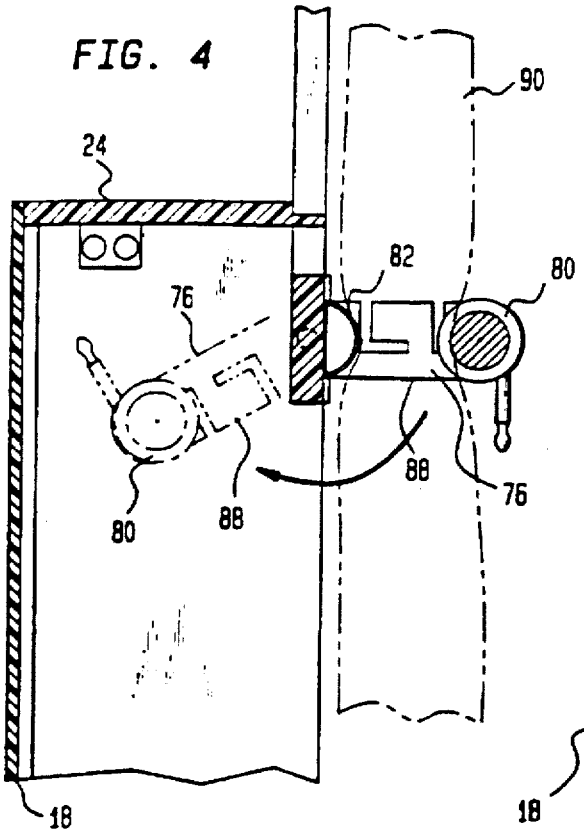
FIG. 4 is a side elevation of a portion of the first storage section of the garment container apparatus of FIG. 1 with a marginal wall broken away, and illustrating a garment restraint structure moving from the open to the stored position, with a garment shown in phantom lines.
Figure 5:
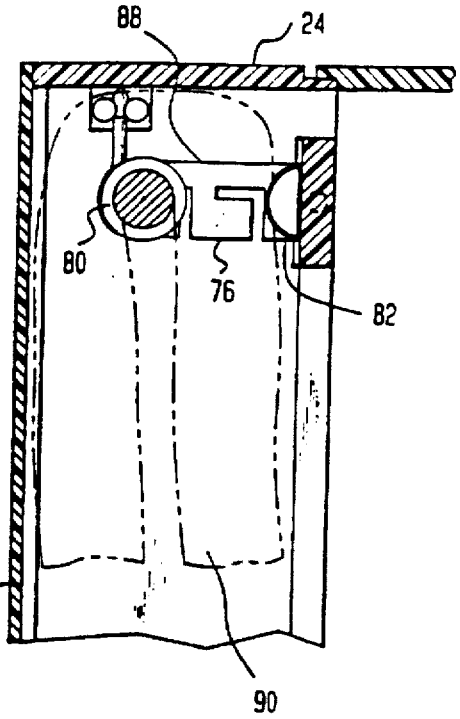
FIG. 5 is a side elevation of a portion of the first storage section of the garment container apparatus of FIG. 1 with a marginal wall broken away, and illustrating a garment restraint structure in the stored position, with a garment shown in phantom lines.

First storage section 12 includes garment support structure 44. The structure 44 comprises first support member 46 and second support member 48. First support member 46 has respective first 50 and second 52 ends. Similarly, second support member 48 has a first end 54 and a second end 56. Second support member 48 also includes latch arm 49. Second end 56 of support member 48 has a pair of hanger pins 58 and 60. As illustrated in FIG. 2, there is a hanger 64 having a plurality conventional openings, which correspond and are designed for fitting engagement with pins 58 and 60.

As shown in FIG. 2, first support member 46 of garment support structure 44 has a mounting structure connected to opposed margin walls 28 and 30. The mounting structure includes adjustable connecting means 76 and 78. As shown, these connecting means are adapted for locking engagement with cushioned rigid restraint means 80.

Adjacent the cushioned rigid restraint means 80 on first support member 46 is inflatable bladder 82. The bladder 82 is connected by air line 84 to inflation bulb 86. As will be more particularly described below, bladder 82 and restraint means 80 define a compression zone 88 therebetween. When garment support structure 44 is in use, garment 90 depends from hanger 64 and is disposed in compression zone 88.

Restraint means 91, including a plurality of restraint members 92, is a light flexible net-like structure which, in a closed position, is anchored to a divider 93 and latches to end wall 26 and extends to margin walls 32 and 34. The integrity of means 91 is preserved in a closed position by two bungee cords stretching from divider 93 to end wall 26 and adjacent to margin walls 32 and 34.

In the open position means 91 is stored in the cavity at the hinge end of second storage section 14, the confines of which are designated by side wall 20, margin walls 32 and 34, the divider 93 and base interior platform 39 located at the base of first storage section 12. This said cavity allows the base of second storage section 14 to envelop the movable storage enclosures 36 and 38 located on the base interior platform of the first storage section 12 when the garment container apparatus 10 is closed.

Conventional wheels are integral to the base 22 for rolling movement of container 10. An extensible handle may be incorporated in the garment container to cooperate with wheels for movement across flat surfaces. The container 10 is lifted by use of hand grip 98, and in the closed position is secured by latches 100 and 102.

During travel, with the container 10 in the closed position, it may be carried in the normal manner by use of hand grip 98. The proper positioning of the first storage section 12 for opening, closing, loading and unloading of the garment container 10 is vertical with base 22 flat on the loading platform. From container 10 in the closed vertical position the second storage section is lowered (open case) and raised (close case) by the hand grip 98.

In order to position the garment support structure 44 for loading, it is necessary to swing moveable storage enclosures 36 and 38 on respective hinges 40 and 42 so that the enclosures 36 and 38 are raised off of base interior platform 39. Enclosures 36 and 38 are thus swung into the open position, as illustrated in FIG. 2.

Garment support structure 44 is now positioned for loading by rotating first support member 46 in a 180° are such that second support member 48 is raised into the vertical position. In this position, latch arm 49 is secured with latch strike 25 to hold support member 48 in the upright position.

In order to accommodate the garment 90 and situate it within the compression zone 88, cushioned restraint means 80 is removed from adjustable connecting means 76 and 78. Hanger 64, with garment 90 attached, may be placed on support member 48 by inserting pins 58 and 60 through conventional openings adapted for the purpose. The back of the garment 90 is then placed against inflatable bladder 82. With the garment 90 in this position, cushioned restrain means 80 is reattached to connecting means 76 and 78. The garment 90 is then arranged so that all wrinkles are flattened and sleeves and lapels are disposed in a manner to avoid additional wrinkling. The pressure of the cushioned restraint means 80 against the garment 90 is sufficient to hold the garment 90 in this position while the garment support structure 44 is upright.

The inflation bulb 86 is now grasped and pumped so that air is forced through the line 84 into the bladder 82, thus inflating the bladder. The compression zone 88 is thereby fully utilized, with the cushioned restraint means 80 locked and bucking the pressure exerted by bladder 82 through the garment 90 packed between them. This pressure is sufficient to hold the garment 90 in its arranged and wrinkle-free condition.

The garment support structure 44 is now in proper condition for closing. Latch strike 25 and latch arm 49 are disengaged and the second support member 48 is rotated downward. This rotation is accomplished by movement of first support member 46 through a 180° arc. It should be observed that in this pivoting movement, the inflated bladder 82 and the cushioned restraint means 80 remain in fixed relationship relative to each other and to the garment 90. Therefore, for example, as second support member 48 rotates to a point 90° from the vertical, the bladder 82 remains attached to first support member 46 and at the back of garment 90, while cushioned restraint means 80 remains at the front of the garment and at the same fixed distance from bladder 82. Likewise, when second support member 48 is rotated into the fully closed position, or 180° from the vertical, bladder 82 and cushion support means 80 remain in the same constant relationship with respect to each other and the garment 90. It should be noted that during the 180° rotation of second support member 48 the attitude of garment 90, when hung on garment structure 44, is changed from a natural hanging full length position located outside the enclosure of the first storage section 12 to a folded position tucked totally within the confines of the first storage section interior.

At the completion of the closing of the 180° pivot of first support member 46, that portion of garment 90 that is restrained in the area between hanger 64 and compression zone 88 is stored upside down just inside the open face of first storage section 12. That portion of garment 90 hanging below the compression zone 88, when the garment support structure 44 is open, is picked up by the cushioned restraint means 80 as the first support member 46 pivots through the 180° closing range, and thrust back and up into the top rear interior area of first storage section 12. This motion allows the lower portion of garment 90 to drape freely over the top surface of the stored and rigid restraint means 80 and down the back inside area parallel to side wall 18 of the first storage section 12.

In the packing of garment container 10 there is no required order of selection when it comes to the loading or unloading of storage sections 12 and 14. Enclosures 36 and 38 have separate covers to retain their contents, regardless of position but must be in the open position to allow raising and closing of garment structure 44 and closed to permit the two storage sections 12 and 14 to be hinged shut. The contents of second storage 14 must be restrained, of course, by means 91 before closing.

Although the invention has been described with reference to the illustrated preferred embodiment, it is noted that variations and changes may be made and equivalents employed herein without departing from the scope of the invention as recited in the claims.

I claim:

1. In a rigid garment container having hingably connected first and second storage sections, the improvement comprising:

a first support member pivotally connected to [opposed marginal] walls of said first storage section for pivotal movement *about a pivot point* between a first open position and a second closed position;

a second support member *radially offset, with respect to the pivot point, from the first support member and* having a first end [permanently] engaged with said first support member in [90°] *angular* relation therewith, and a second end adapted to removably receive a plurality of clothing hangers;

said first support member including mounting structure adapted to removably receive [cushioned] restraint means;

said mounting structure further including [inflatable bladder] means disposed opposite said restraint means [and] *for* defining a compression zone therebetween;

said compression zone adapted to receive a plurality of garments therein when said garments are disposed on said clothing hangers;

[said bladder means,] said *second support member,* garments and [said] restraint means pivoting about the [same] *pivot* point and remaining in the same relationship to each other when said first support member is pivoted between said first open position and said second closed position.

2. The garment container as set forth in claim 1 wherein each of said first and second storage sections include rigid side walls, defining opposite sides of said container when said container is in the closed position.

3. The garment container as set forth in claim 2 wherein each of said rigid side walls has a plurality of marginal walls defining said first and second storage sections.

4. The garment container as set forth in claim 1 wherein said first and second storage sections are selectively hingable with respect to each other by at least approximately 90° between open and closed positions for defining open and closed positions of said container.

5. The garment container as set forth in claim 1 wherein said first storage section includes at a base thereof adjacent the hinged connection between said first and second storage sections a plurality of moveable storage enclosures.

6. The garment container as set forth in claim 5 wherein each of said storage enclosures is pivotally connected to the base of said first storage section for swinging movement between a first stored position and a second open position.

7. The garment container as set forth in claim 1 wherein the mounting structure extends between opposed marginal walls in parallel relation to the hinged connection between said first and second storage sections.

8. The garment container as set forth in *claim 1* wherein the mounting structure has at opposed ends thereof adjustable connecting means for removably receiving said [cushioned] restraint means.

9. The garment container as set forth in claim 1 wherein said second storage section has adjustable restraint means disposed between opposing side walls.

10. In a rigid garment container having hingably connected first and second storage sections, the improvement comprising:

said first storage section having garment support structure including a first support member and a second support member;

said first support member pivotally connected to [opposed marginal] walls of said first storage section for pivotal movement *about a pivot point* between a first open position and a second closed position;

said second support member *radially offset, with respect to the pivot point, from the first support member and* having a first end and a second end, said first end [permanently] engaged with said first support member such that each said support member is in [90°] *angular* relation to the other, said second end adapted to removably receive a plurality of clothing hangers;

said first support member including mounting structure extending between [opposed marginal] walls in parallel relation to the hinged connection between said first and second storage sections;

said mounting structure having at opposed ends thereof adjustable connecting means adapted to removably receive [cushioned rigid] restraint means[;

said mounting structure further including an integral inflatable bladder means disposed on said mounting structure] so that when said restraint means is connected to said mounting structure, a compression zone is defined between said [bladder means] *mounting structure* and said restraint means;

said compression zone being adapted to receive a plurality of garments therein when said garments are disposed on said clothing hangers in such manner that as said first support member is pivoted from a first opened position to a second closed position, said [bladder means] *second support member, said mounting structure,* and said restraint means move arcuately while remaining in fixed relationship to each other and to said garment.

11. A garment container as set forth in claim 10 wherein each of said first and second storage sections include rigid side walls, defining opposite sides of said container when said container is in the closed position.

12. A garment container as set forth in claim 11 wherein each of said rigid side walls has a plurality of marginal walls defining first and second storage sections.

13. A garment container as set forth in claim 10 wherein each of said first and second storage sections are selectively hingable with respect to each other by at least approximately 90° between open and closed positions for defining open and closed positions of said container.

14. A garment container as set forth in claim 10 wherein said first storage section includes at a base thereof adjacent the hinged connection between said first and second storage sections a plurality of movable storage enclosures.

15. A garment container as set forth in claim 14 wherein each of said storage enclosures is pivotally connected to the base of said first storage section for swinging movement between a first stored position and a second open position.

16. A garment container as set forth in claim 10 wherein said second storage section includes adjustable restraint means disposed between opposing marginal walls.

17. A garment container apparatus comprising:

a rigid outer structure having hingably connected first and second storage sections;

each of said first and second storage sections including rigid side walls, defining opposite sides of said container when said container is in the closed position;

each of said rigid side walls having a plurality of marginal walls defining said first and second storage sections;

said first and second storage sections being selectively hingable with respect to each other by at least approximately 90° between open and closed positions for defining open and closed positions of said container;

said first storage section including at the base thereof adjacent the hinged connection between said first and second storage sections a plurality of movable storage enclosures;

each of said storage enclosures pivotally connected to the base of said first storage section for swinging movement between a first stored position and a second open position;

said first storage section having garment support structure including a first support member and a second support member;

said first support member pivotally connected to [opposed marginal] walls of said first storage section for pivotal movement between a first open position and a second closed position;

said second support member having a first end and a second end, said first end [permanently] engaged with said first support member such that each said support member is in [90°] *angular* relation to the other, said second end adapted to removably receive a plurality of clothing hangers;

said first support member including mounting structure extending between [opposed marginal] walls in parallel relation to the hinged connection between said first and second storage sections;

said mounting structure having at opposed ends thereof adjustable connecting means adapted to removably receive [cushioned rigid] restraint means[;

said mounting structure further including an integral inflatable bladder means disposal on said mounting structure] so that when said restraint means is connected to said mounting structure, a compression zone is defined between said [bladder means] *mounting structure* and said restraint means;

said compression zone being adapted to receive a plurality of garments therein when said garments are disposed on said clothing hangers in such a manner that as said first support member is pivoted from a first open position to a second closed position, said [bladder means] *mounting structure* and said restraint means move arcuately while remaining in fixed relationship to each other and to said garments;

said second storage section having adjustable restraint means disposed between opposing [marginal] walls.

*18. The garment container as set forth in claim 1 wherein said means for defining a compression zone comprises inflatable bladder means.*

*19. A garment container as set forth in claim 10 wherein said mounting structure further includes an integral inflatable bladder means.*

*20. A garment container as set forth in claim 17 wherein said mounting structure further includes an integral inflatable bladder means.*

* * * * *